US010267259B2

(12) United States Patent
Riegger et al.

(10) Patent No.: US 10,267,259 B2
(45) Date of Patent: Apr. 23, 2019

(54) CYLINDER HEAD WITH VALVE DEACTIVATORS

(71) Applicant: Ford Global Technologies, LLC, Dearborn, MI (US)

(72) Inventors: John Christopher Riegger, Ann Arbor, MI (US); Theodore Beyer, Canton, MI (US); Jeff D. Fluharty, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/278,258

(22) Filed: Sep. 28, 2016

(65) Prior Publication Data

US 2018/0087469 A1    Mar. 29, 2018

(51) Int. Cl.
*F02F 1/42* (2006.01)
*F01L 1/053* (2006.01)
(Continued)

(52) U.S. Cl.
CPC ............ *F02F 1/4214* (2013.01); *F01L 1/053* (2013.01); *F01L 1/185* (2013.01); *F02D 13/06* (2013.01); *F02D 17/02* (2013.01); *F01L 2001/0476* (2013.01); *F01L 2001/0537* (2013.01); *F01L 2001/186* (2013.01); *F01L 2013/001* (2013.01); *F01L 2103/00* (2013.01); *F01L 2105/00* (2013.01); *F01L 2250/04* (2013.01); *F01L 2800/08* (2013.01); *F01L 2810/02* (2013.01); *F01L 2810/04* (2013.01); *F02B 75/22* (2013.01);
(Continued)

(58) Field of Classification Search
CPC ........ F02F 1/4214; F02D 13/06; F02D 17/02; F01L 1/185; F01L 1/053; F01L 2810/02; F01L 2250/04; F01L 2105/00; F01L 2103/00; F01L 2013/001; F01L 2001/186; F01L 2810/04; F01L 2001/0476; F01L 2001/0537; F02B 75/22; F02B 2075/1832
See application file for complete search history.

(56) References Cited

U.S. PATENT DOCUMENTS 4,951,622 A * 8/1990 Takahashi ................ F01M 9/10
                                                      123/193.5
5,038,732 A    8/1991 Matayoshi et al.
(Continued)

FOREIGN PATENT DOCUMENTS

WO    2010086800 A1    8/2010
WO    2015171688 A1    12/2015

*Primary Examiner* — Mark A Laurenzi
*Assistant Examiner* — Wesley G Harris
(74) *Attorney, Agent, or Firm* — Gregory P. Brown; Diana D. Brehob; Brehob Law, PLLC

(57) ABSTRACT

To improve fuel efficiency, some gasoline engines are equipped with valve deactivators in some of the cylinders so that at low torque conditions only a subset of the total number of cylinders are active. In prior art engines, particularly when they have four valves per cylinder, space is tight. It is known to provide a cam carrier in the head between the cylinder head and the camshaft. The cylinder head bolts pass through the head under the cam carrier. According to the present disclosure, the cam carrier, and its associated disadvantages, is obviated by widening the bearings for the camshafts, using smaller diameter head bolts, and putting the orifices for the head bolts directly through the bearings.

16 Claims, 9 Drawing Sheets

(51) Int. Cl.

| | |
|---|---|
| *F02D 13/06* | (2006.01) |
| *F02D 17/02* | (2006.01) |
| *F01L 1/18* | (2006.01) |
| *F02B 75/22* | (2006.01) |
| *F01L 1/047* | (2006.01) |
| *F02B 75/18* | (2006.01) |
| *F01L 13/00* | (2006.01) |

(52) U.S. Cl.
CPC ....... *F02B 2075/1832* (2013.01); *Y02T 10/18* (2013.01)

(56) References Cited

U.S. PATENT DOCUMENTS

| | | | |
|---|---|---|---|
| 6,470,840 | B1 | 10/2002 | Ebesu et al. |
| 8,931,444 | B2 | 1/2015 | McConville et al. |
| 2003/0172889 | A1* | 9/2003 | Djordjevic ................ F01L 1/08 123/90.16 |
| 2017/0356372 | A1* | 12/2017 | Richards ................ F02D 13/06 |

* cited by examiner

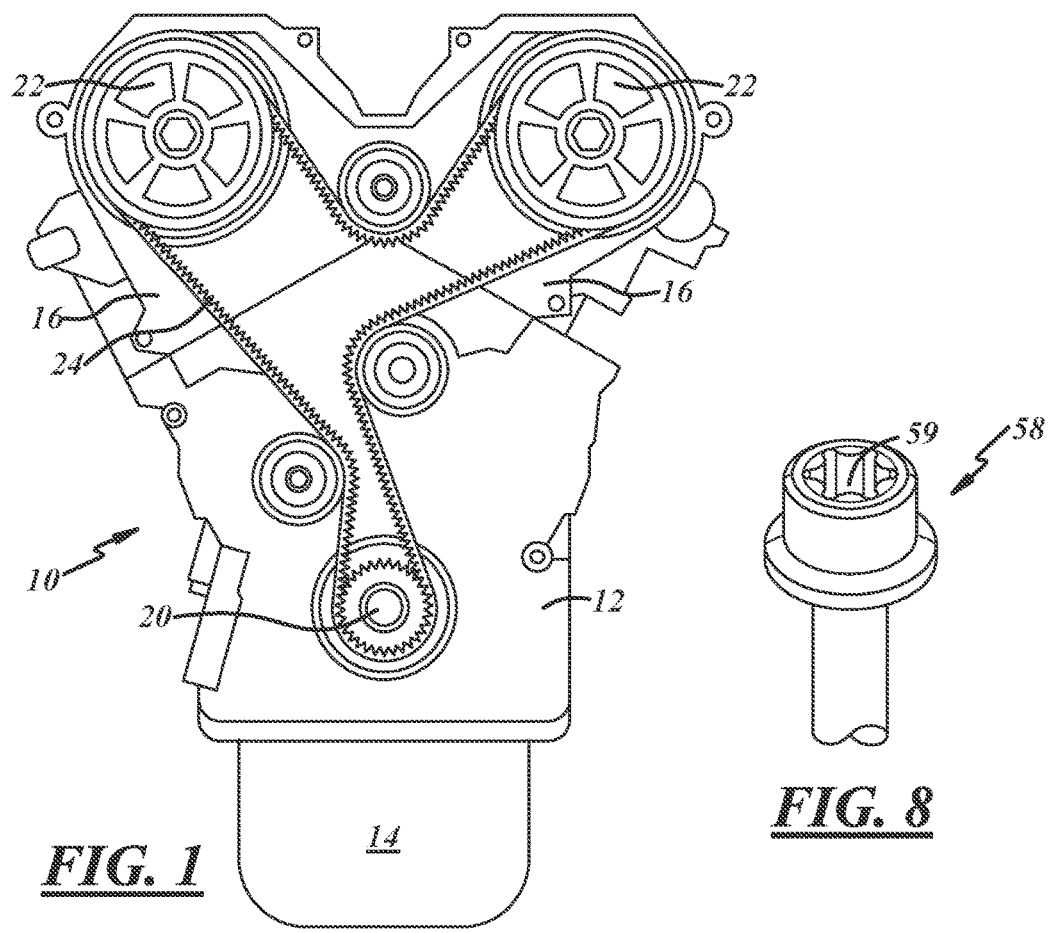
FIG. 1
FIG. 8
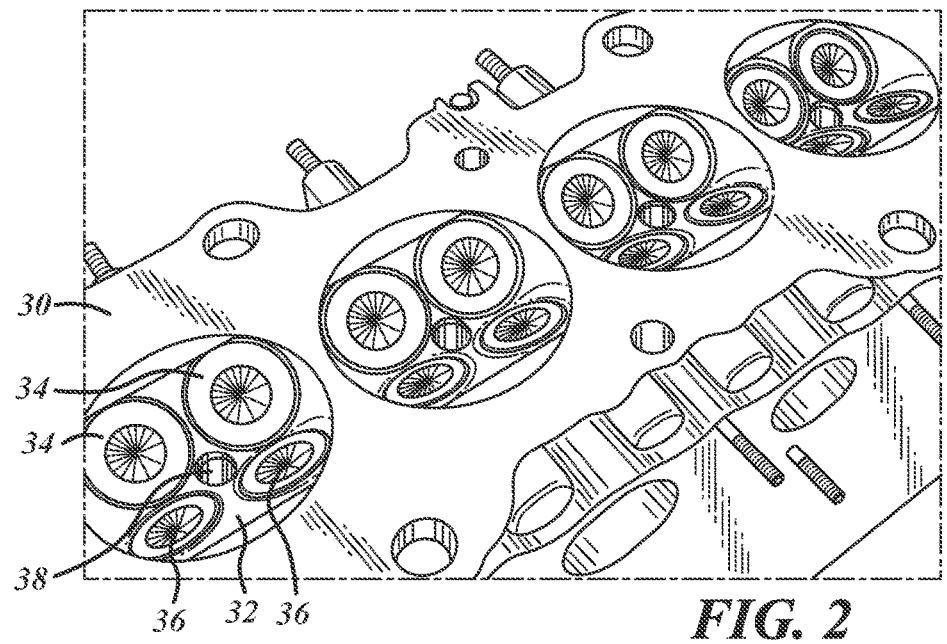
FIG. 2 ately half, are equipped with deactivators, the packaging of which complicates the cylinder head layout because the deactivatable finger follower is bulkier. Such an engine is referred to as Variable Displacement Engine (VDE), Displacement on Demand, Cylinder Deactivation, Active Fuel Management, etc.

CYLINDER HEAD WITH VALVE DEACTIVATORS

FIELD

The present disclosure relates to cylinder heads for internal combustion engines, in particular those with valve deactivators.

BACKGROUND

It is well-known that efficiency of a spark-ignition engine suffers when torque demand is low. In engines provided with cylinder deactivation, efficiency at such low-torque operation conditions can be improved by deactivating some cylinders, which causes activated cylinders to operate at a higher torque operating condition than they would be otherwise if all the cylinders were activated. When cylinder deactivation mode is scheduled, the exhaust and intake valves are decoupled from the cam lobe motion by means of a switchable or deactivatable roller finger follower. The cam motion is absorbed as lost motion within the follower. Thus, the valves remain closed and their respective cylinders are inactive. Typically, a portion of the cylinders, often half, are equipped with deactivators, the packaging of which complicates the cylinder head layout because the deactivatable finger follower is bulkier. Such an engine is referred to as Variable Displacement Engine (VDE), Displacement on Demand, Cylinder Deactivation, Active Fuel Management, etc.

An illustration of a front end of an internal combustion engine 10 is shown in FIG. 1. Engine 10 has a block 12 to which an oil pan 14 is coupled. Engine 10 is a vee engine having two cylinder heads 16. A crankshaft (not shown) is coupled to a pulley 20. Camshafts (not shown) are coupled to pulleys 22. A belt 24 is driven by crankshaft pulley 20 to drive camshaft pulleys 22.

An underside of a cylinder head 30 is show in FIG. 2. The heads of two intake poppet valves 34 and the heads of two exhaust poppet valves 36 are contained within the upper portion of the combustion chamber 32. The combustion chamber is defined by the piston top (not shown), the cylinder wall (not shown), and the upper portion of the combustion chamber 32, called combustion chamber top herein. Orifice 38 is provided for a spark plug. A combustion chamber in a typical, internal-combustion engine is defined by a cylinder wall, a top of a piston that reciprocates within the cylinder wall, and a portion of a cylinder head that includes the intake and exhaust valves. Herein, the portion of the combustion chamber in the cylinder head is called a combustion chamber top.

A prior art cylinder head 50 having cylinder deactivation is shown in FIG. 3. Cylinder head 50 covers four cylinders with two intakes and two exhaust valves per cylinder, thus, 16 valves (not shown). A flange 52 is provided for a valve cover (not shown) to be affixed to the valve train side of cylinder head 50. In the embodiment shown in FIG. 3, valves associated with the outer cylinders are deactivatable and valves associated with the inner cylinders are fixed. Eight deactivatable roller finger followers 54, four exhausts on the left side of FIG. 3 and four intakes on the right side, have the ability to become lost motion devices based on hydraulic pressure provided to followers 54. Any other suitable mechanism or system to actuate may be substituted. Deactivatable followers 54 are wider than fixed roller finger follower 56 provided for the inside cylinders. Inner cylinders are provided with fixed roller finger followers 56: four for exhaust valves on the left hand side and four for intake valves on the right hand side. The deactivatable followers 54 complicate an already crowded cylinder head because they are wider than fixed followers 56. In addition to having four valves and the associated valvetrain hardware to actuate the valves, a spark plug and a direct injector, in some cases, must access the inside of the cylinder head.

The poppet valves are not visible in FIG. 3 due to the followers occluding the valve tip and valve springs occluding the valve stems. Numerals for only one each of sixteen valve springs 60 and sixteen retainers 62 are provided in FIG. 3 in the interest of clarity for other elements that will be discussed in more detail. FIG. 3 is a view of the valvetrain without at least the cam carrier, the camshafts, the cam towers, the cam caps, and the cam cover affixed. Head bolts 58 affix cylinder head 50 to the engine block (not shown in FIG. 3). Orifices 64 are provided for affixing the cam carrier (not shown in this view).

At the front of cylinder head 50 (bottom edge of FIG. 3) an exhaust camshaft pulley 42 and an intake camshaft pulley 44 are visible.

A cam carrier 180 is shown in FIG. 4. Cam carrier 180 has semicircular bearings 186 and 188. The left hand bearings support journals of an exhaust camshaft (not shown); the right hand bearings support journals of an intake camshaft (not shown). Orifices 164 and 165 provided through cam carrier 180 are used to secure cam caps (not shown) to secure the camshafts within bearings 186 and 188. Other orifices 167 are provided as bolt through holes to secure cam carrier 180 to the cylinder head.

In FIG. 5, cylinder head 50 is shown with cam carrier 80 installed via bolts 67. Cam carrier 80 has an outer wall 84 to provide structure for cam carrier 80. Bearings 88, that are essentially hemispherical, are provided to cradle camshafts (not shown). During operation, pressurized oil is provided to bearings 88 to lubricate the rotating camshaft (not shown) moving with respect to bearings 88. Bearings 88 of cam carrier 80 are mounted over head bolts 58 (shown in FIG. 3) with only a small portion of some of the head bolts visible beyond bearings 88. The width of bearings 88 are shown by dimension 90.

In FIG. 6, an exhaust camshaft 100 and an intake camshaft 102 are shown installed in cylinder head 50 with cam caps 104 and 108 capturing exhaust camshaft 100 and cam caps 106 and 109 capturing intake camshaft 102. Cam caps 104, 106, 108, and 109 are secured to the cylinder head via bolts 120 that extend through cam carrier 80 and into cylinder head 50. Bolts 120 assist in affixing cam carrier 80 to cylinder had 50. Cam caps 104, 106, 108, and 109 are secured on the inner side by bolts 122 that affix to cam carrier 80. Cam carrier is secured to cylinder head 50 via bolts 67. Intake and exhaust camshafts 102 and 100 are provided with lobes 112 and 110, respectively, that press on followers (not visible) to actuate intake and exhaust valves, respectively.

It would be desirable to obviate the cam carrier in such a cylinder head to simplify assembly, reduce weight, reduce cost, and reduce part count.

SUMMARY

A cylinder head assembly for an internal combustion engine that overcomes problems in the prior art includes: a cylinder head that has a plurality of combustion chambers tops each having two intake and two exhaust valves, cam towers unitarily formed with the cylinder head, and an intake camshaft having multiple cam lobes that act upon the intake valves via intake followers disposed in the cylinder head wherein at least a portion of the followers are deactivatable.

The cylinder head assembly also includes: an exhaust camshaft having multiple cam lobes that act upon the exhaust valves via exhaust followers disposed in the cylinder head and a bearing surface disposed between each pair of cam towers. The intake camshaft is cradled in a first plurality of the bearing surfaces. The exhaust camshaft is cradled in a second plurality of the bearing surfaces.

The bearing surfaces have orifices defined therein to accommodate head bolts.

The bearing surfaces have first lands on a first side of the orifice associated with the bearing surface and second lands on a second side of the orifice.

The cylinder head has four cylinders, all of the valves associated with the inner cylinders having deactivatable followers and all of the valves associated with the outer cylinders having fixed followers. In other embodiments, the cylinder head has more or fewer cylinders.

The bearing surfaces are unitary with the cylinder head.

Also disclosed is an engine having: a cylinder block and a cylinder head. The cylinder head has: cam towers unitarily formed with the cylinder head, semicircular bearings located between pairs of cam towers with orifices defined within the bearings, cylinder head bolts inserted in the orifices that engage with the cylinder block, a camshaft cradled in a plurality of the bearings and having a plurality of cam lobes that act upon valves, and an intake camshaft having multiple cam lobes that act valves disposed in the cylinder head via intake followers wherein at least a portion of the followers are deactivatable.

The engine further includes cam caps placed over the camshaft and bolts installed into orifices in the cam caps engaging with threads in the cam towers.

The engine has an intake camshaft that actuates intake valves and an exhaust camshaft that actuates exhaust valves. The intake camshaft is cradled in a first plurality of the bearings and the exhaust camshaft is cradled in a second plurality of the bearings.

In some embodiments, the engine has an engine bank having four cylinders. Valves in a first and a second of the four cylinders are provided with deactivatable followers. Valves in a third and a fourth of the four cylinders are provided with fixed followers.

The bearings are unitary with the cylinder head.

The bearing surface has first and second lands on first and second sides of the orifice.

Also disclosed is a method to assemble an engine that includes: casting a cylinder head that comprises combustion chamber tops and a plurality of cam towers, the cam towers having bearing surfaces each having an orifice defined in the bearing surfaces, bolting the cylinder head to an engine block with bolts passing through the orifices in the bearing surfaces of the cam towers; and installing followers in the cylinder head, at least half of the followers being deactivatable followers.

The method includes: installing two intake poppet valves and two exhaust poppet valves into ports formed in each of the combustion chamber tops in the cylinder head.

The method includes: installing a plurality of non-deactivatable followers in the cylinder head.

The cylinder head has four combustion chamber tops. Each combustion chamber top has two intake valves and two exhaust valves disposed in each combustion chamber top. Half of the intake valves and half of the exhaust valves are provided with the deactivatable followers.

The method also includes: placing camshafts in the cam towers and installing cam caps onto cam towers of the cylinder head to thereby capture the camshafts.

The cam towers are unitary with the cylinder head.

The bearing surfaces have a first land on a first side of the orifice and a second land on a second side of the orifice.

The cylinder head has two deactivatable cylinders and two non-deactivatable cylinders. The method includes installing deactivatable followers in valves associated with the two deactivatable cylinders and installing non-deactivatable followers in valves associated with the two non-deactivatable cylinders.

BRIEF DESCRIPTION OF THE DRAWINGS

FIG. 1 is an illustration of an internal-combustion engine;

FIG. 2 is an illustration of an underside of a cylinder head;

FIG. 8 shows a head bolt with a small overall diameter;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Many advantages accrue to the engine manufacturer if the cam carrier is integrated into the cylinder head, i.e., the separate part obviated. Bolts that are used to couple the cam carrier to the cylinder head and the concomitant thicker part of the cam carrier to provide threads and sufficient stiffening can be eliminated. The advantages include at least: cost savings, reduced part count, weight savings, and simplified assembly.

Inaccuracy in the tolerances lead to valvetrain noise and durability concerns. By obviating the cam carrier, i.e., fewer parts, there is less variation due to stackup, i.e., improved dimensional accuracy. According to embodiments in the disclosure, accuracy is improved to avoid valvetrain noise and reduced durability.

Figure 7:
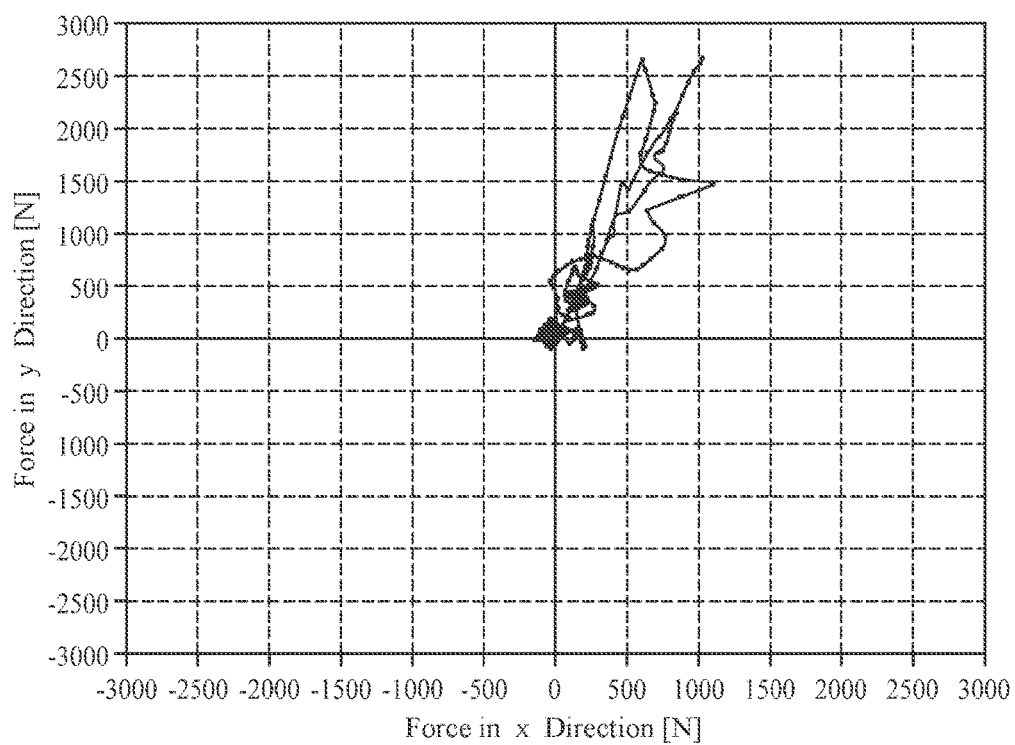
FIG. 7 is a graph of forces exerted by a camshaft on bearing surfaces associated with a bearing and cam cap.
Figure 5:
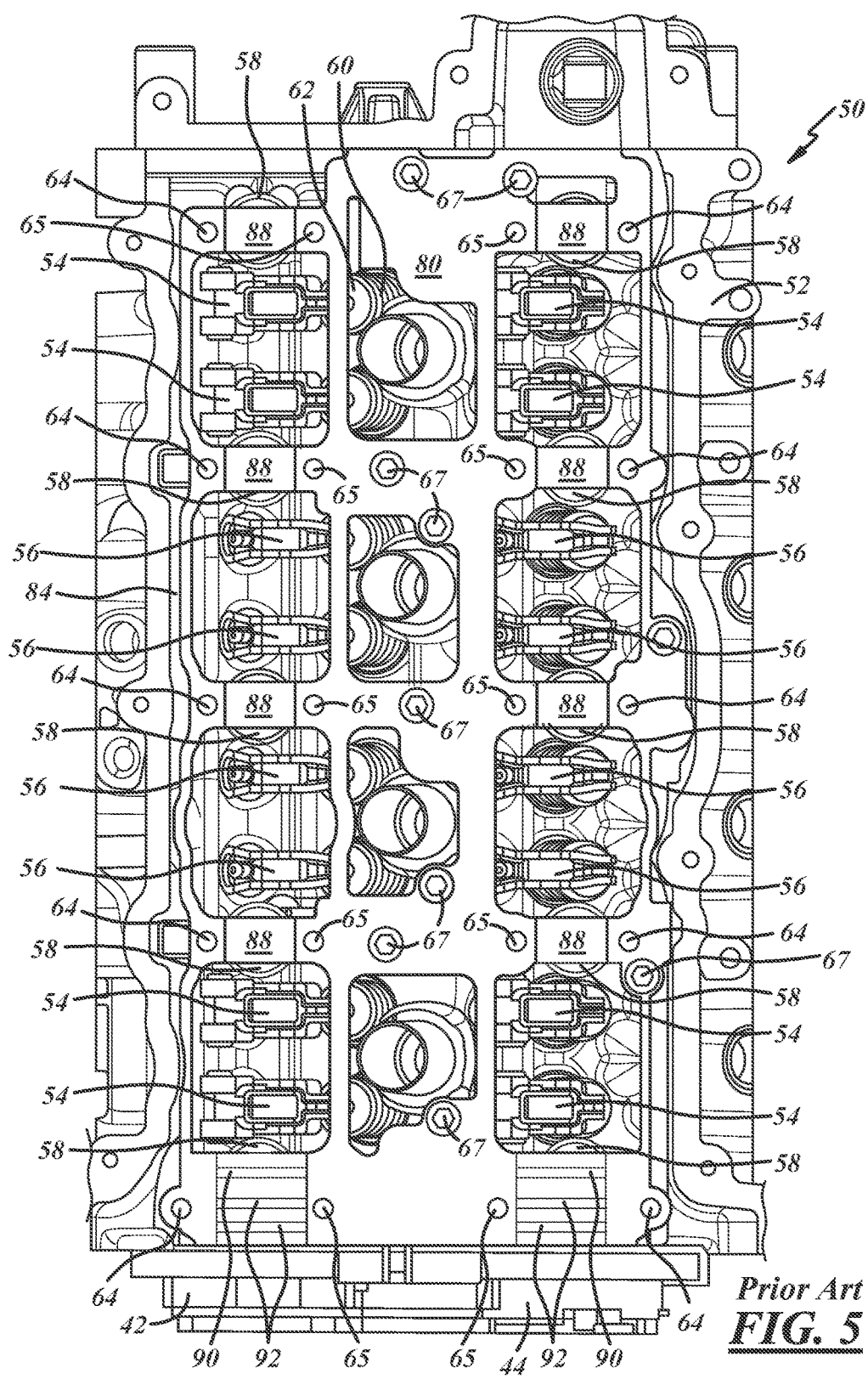
Figure 6:
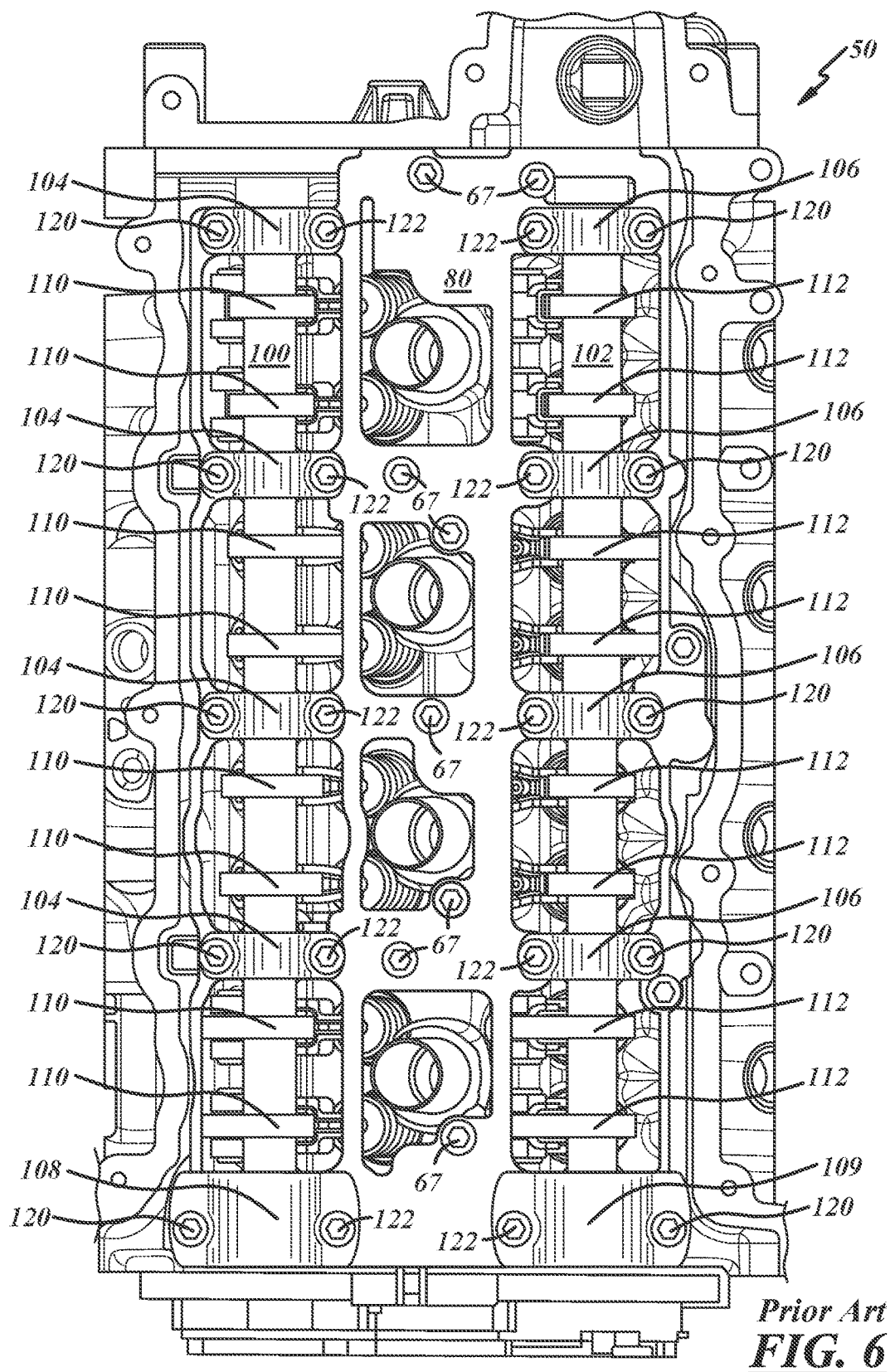

In FIG. 7, a graph of the forces on the bearing is shown over the course of two revolutions. Because there is a valve spring associated with each of the valves that pushes upward, the forces are overwhelmingly in the positive y direction. There is rarely downward force on bearing 88 of FIG. 5, and even when downward, the force is of a trivial magnitude. Thus, the surface area on bearing 88, i.e., the width, is greater than needed in the part of the bearing 88 shown in FIG. 5. Cam caps 104 and 106 (FIG. 6) are affixed to the cam towers on either side of bearing 88. The positive y force shown in FIG. 7 is against the cam caps. This bearing surface area in cam caps cannot be reduced. In some prior art cylinder heads, the width of the cam cap is wider in recognition that the forces against the cam cap are greater than against the bearing opposite the cam cap.

According to embodiments of the disclosure, the width of the bearing is increased and the orifices for the head bolts are machined directly through the bearing, i.e. the part of the bearing surface that has low forces. The hole for the head bolt is centered on the bearing so that there is a land on either side of the bolt hole to maintain an oil film.

Another feature that facilitates putting the head bolt through the bearing is a smaller-outer diameter head bolt. A head bolt 58 that has an internal drive 59 is shown in FIG. 8. Internal drive 59 facilitates the smaller overall diameter.

Figure 3:
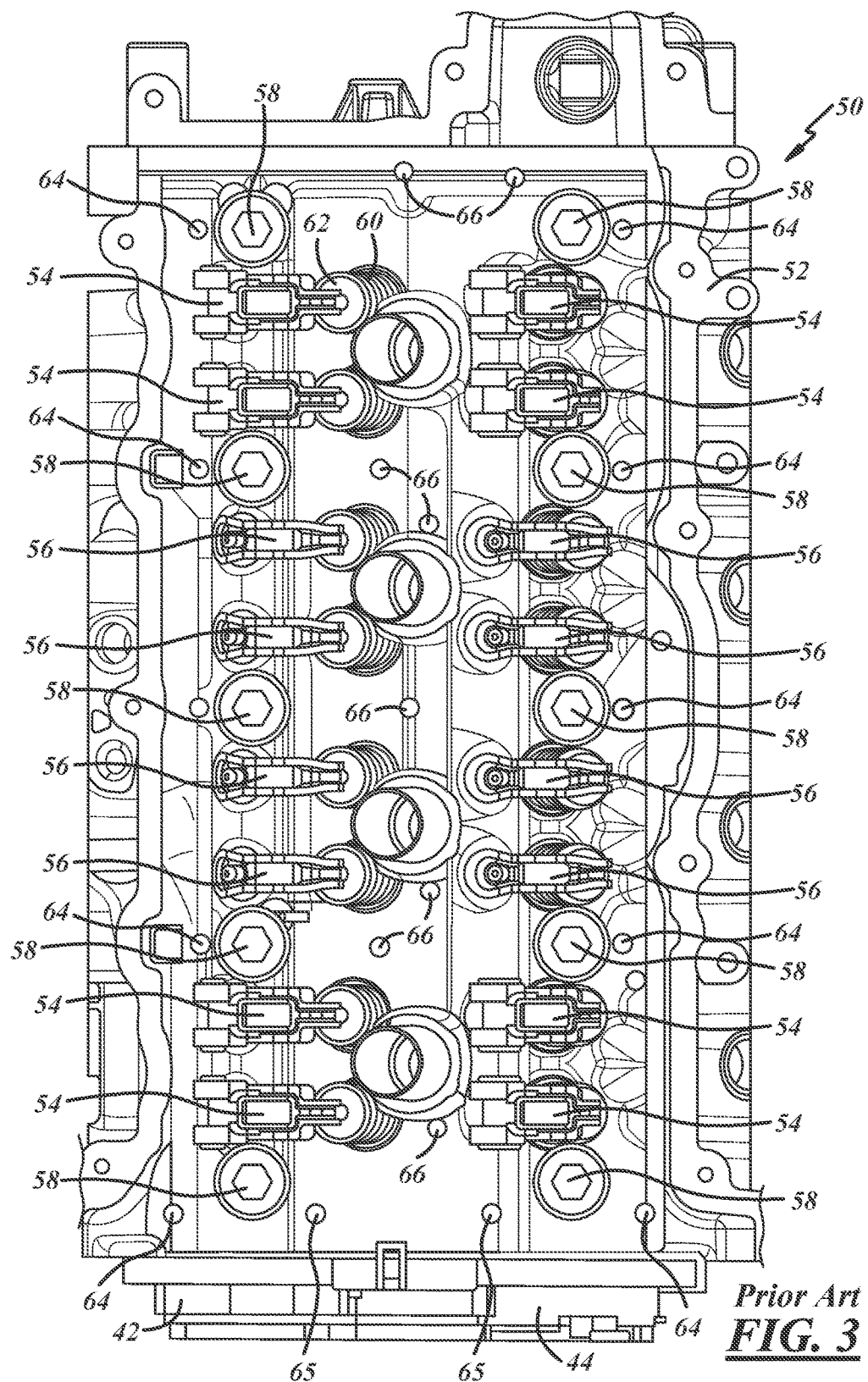
FIGS. 3, 5, and 6 are illustrations of a prior art cylinder head in several stages of assembly.
Figure 4:
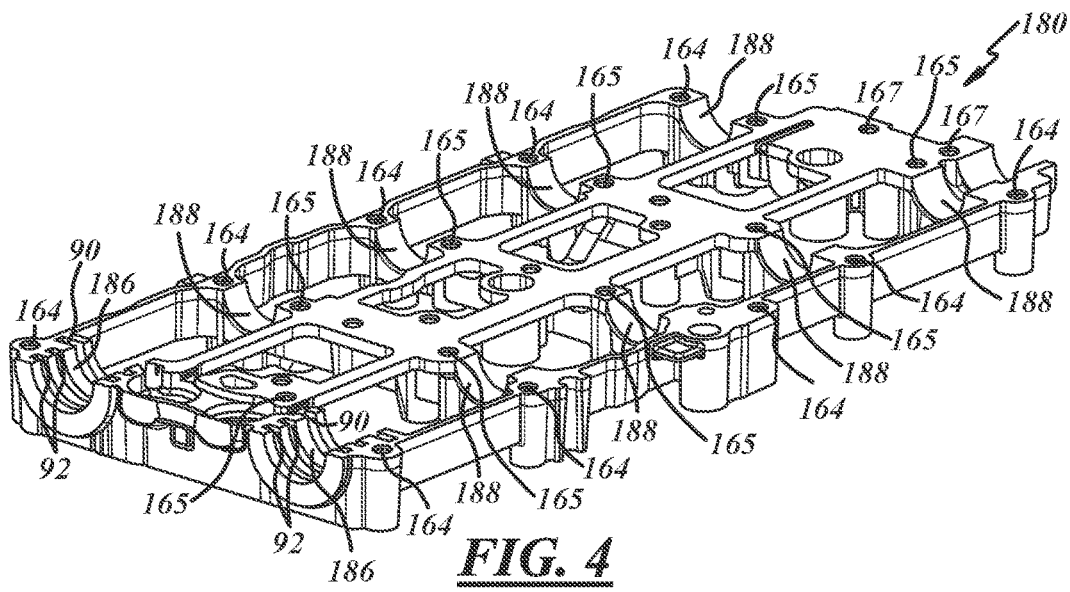
FIG. 4 is an illustration of a prior art cam carrier.
Figure 9:
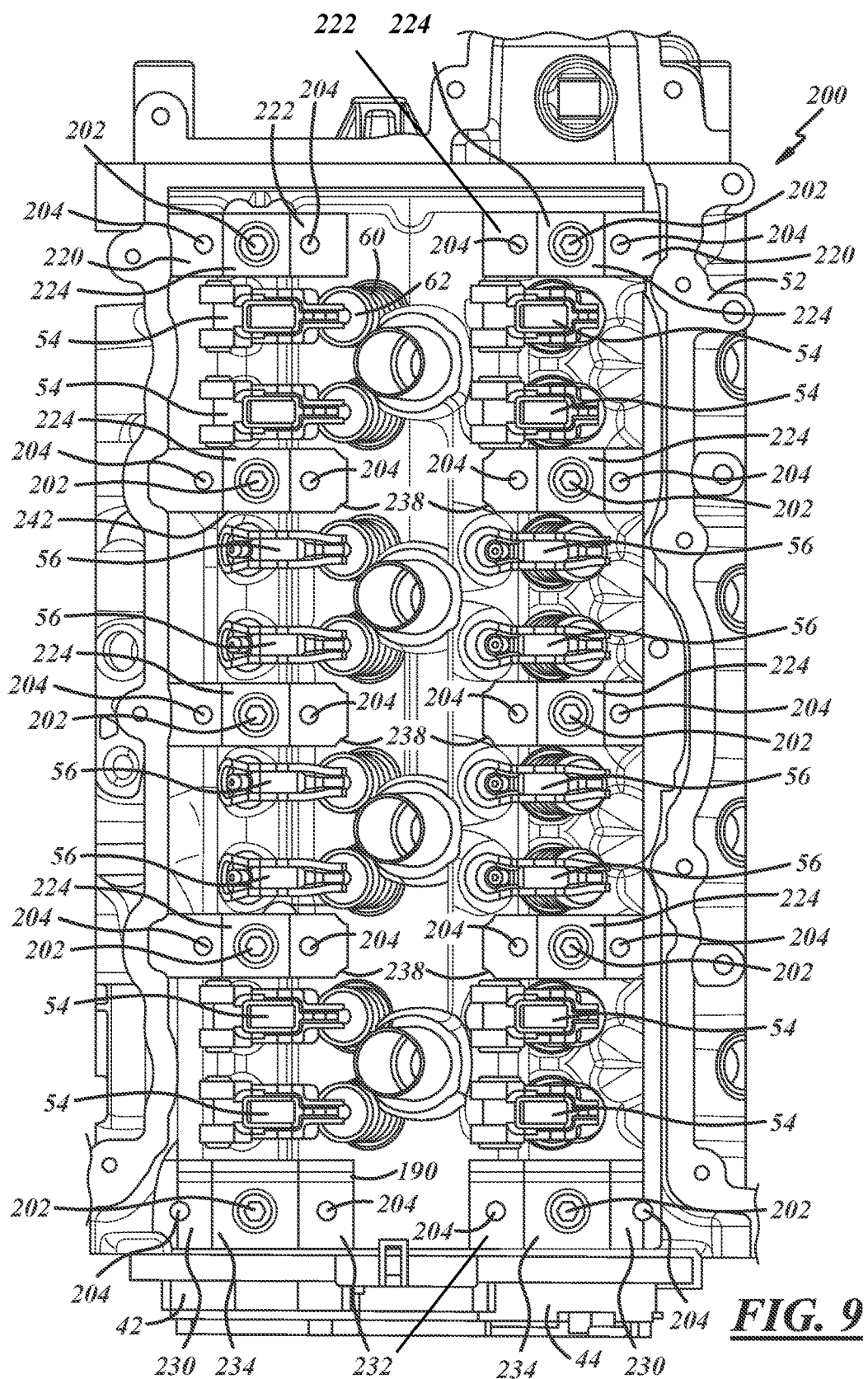
FIGS. 9 and 10 show a cylinder head according to embodiments of the present disclosure.

A cylinder head 200 in which head bolts are inserted through bearings is shown in FIG. 9. Head bolts 202 are internal drive bolts that are smaller in diameter than bolts 58 in FIG. 3. Head bolts 202 are centered on bearing 224. On either side of bearing 224 are cam towers 220 and 222 that have orifices 204 into which bolts are inserted to attach a cam cap. Bearings 224 and cam towers 220 and 222 are formed out of the parent material of cylinder head 200. This is in contrast to the cylinder head in FIGS. 5 and 6 in which bearings 88 and the cam towers on either side of bearing 88, which are not separately called out, are formed in a separate component, i.e., cam carrier 80. Referring again to FIG. 9, at the front of the engine proximate pulleys 42 and 44, bearings 234 have a groove 190. A thrust bearing (not shown) engages with groove 190. The graph in FIG. 7 generally applies to bearings 224. However, bearings 234 proximate pulleys 42 and 44 have mostly upward forces. To allow head bolts to traverse through bearings 234 while continuing to provide sufficient bearing surface, the width is markedly wider than the other bearings. Furthermore, only one groove 190 is provided. Grooves 92 that are shown in prior art cam carrier of FIG. 4 are provided in the cam cap of the disclosed cylinder head (not shown in FIG. 9). On either side of bearing 234 are cam towers 230 and 232, similar to bearings 224 described above.

Figure 10:
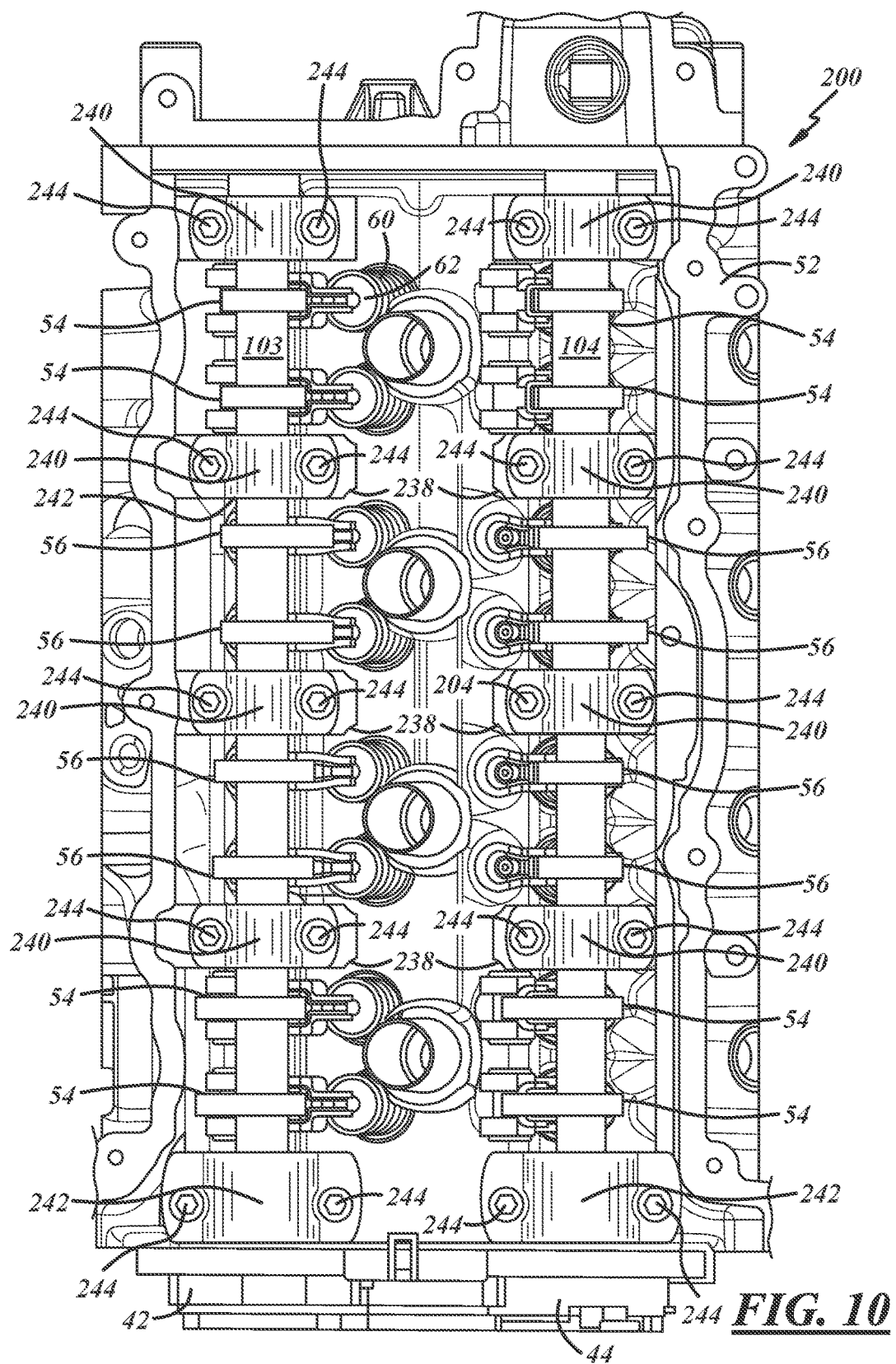

In FIG. 10, cylinder head 200 is shown with cam caps 240 and 242 installed to secure exhaust camshaft 103 and intake camshaft 104. Cam caps 240 are secured via bolts 240 that engage with the cam towers that are integral with cylinder head 200. Cam caps 242 are secured via bolt 244 that engage with cam towers integral with cylinder head 200.

The cam towers are cast with cylinder head 200. Casting processes do not provide the dimensional accuracy for many purposes. The cam towers are machined to provide bearing surfaces for the camshaft, as an example. In that situation, both the dimensional accuracy and surface finish are provided via the machining. The outside surfaces of the cam towers can encroach upon the space needed for the deactivatable followers, which are wider than the standard followers that do not allow deactivation. The cylinder head is machined to ensure that there is sufficient space for the deactivatable followers. Some of the material of the cam towers proximate the deactivatable followers or the valve springs may be removed to accommodate the deactivatable followers or other elements in the cylinder head. An example of material from cam towers is shown as 238 in FIG. 10. According to an embodiment of the disclosure, the normal wider tolerances between the cam towers and the components proximate the cam towers, e.g., valve springs or roller finger followers, is made narrower so that the components can be packaged. Where there are inaccuracies in the casting that yields overlap of the cam tower with one of these components, the cam tower is separately machined to provide the desired clearance between components.

Figure 11:
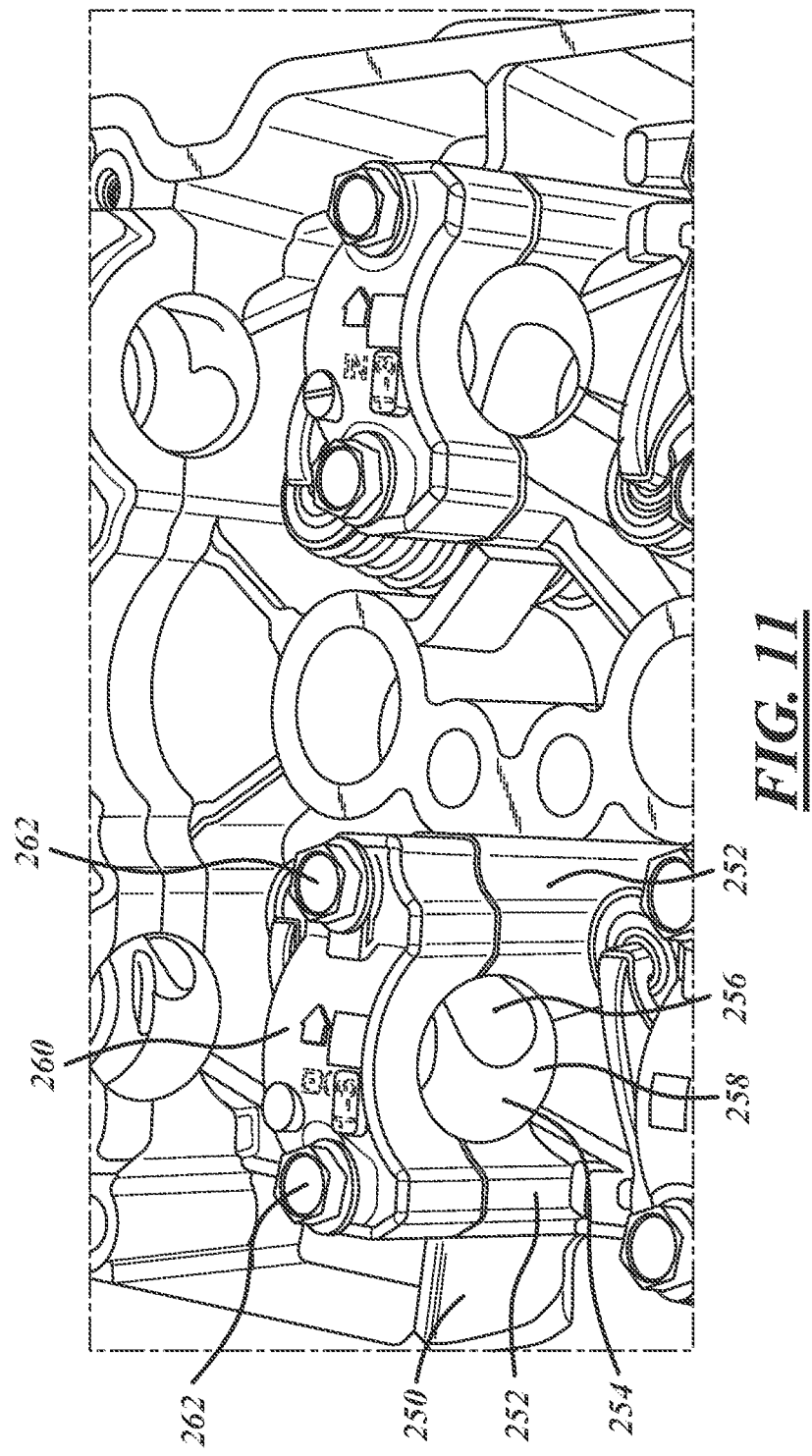
FIG. 11 is a cylinder head according to an embodiment of the present disclosure.

Another view of a portion of a cylinder head 250 in FIG. 11 shows cam towers 252 that are integrally formed with cylinder head 250. A bearing 254 is provided between cam towers 252 and supports a journal of a camshaft (not shown). Bearing 254 has an orifice 256 into which a cylinder head bolt (not visible) is inserted to couple cylinder head 250 with a block (not shown). Bearing 254 has lands 258 on either side of orifice 256 that are sufficient to limit oil leakage to provide a proper oil film thickness so that the journal of the camshaft is properly lubricated. After head bolts secure cylinder head 250 to the block, cam caps 260 are secured to cam towers 252 via bolts 262. In practice, the camshaft is placed onto bearing 254 prior to installing cam caps 260. However, orifice 256 would be occluded by the camshaft. Thus, the camshaft is not included in FIG. 11 for illustrative purposes.

Figures 12, 13:
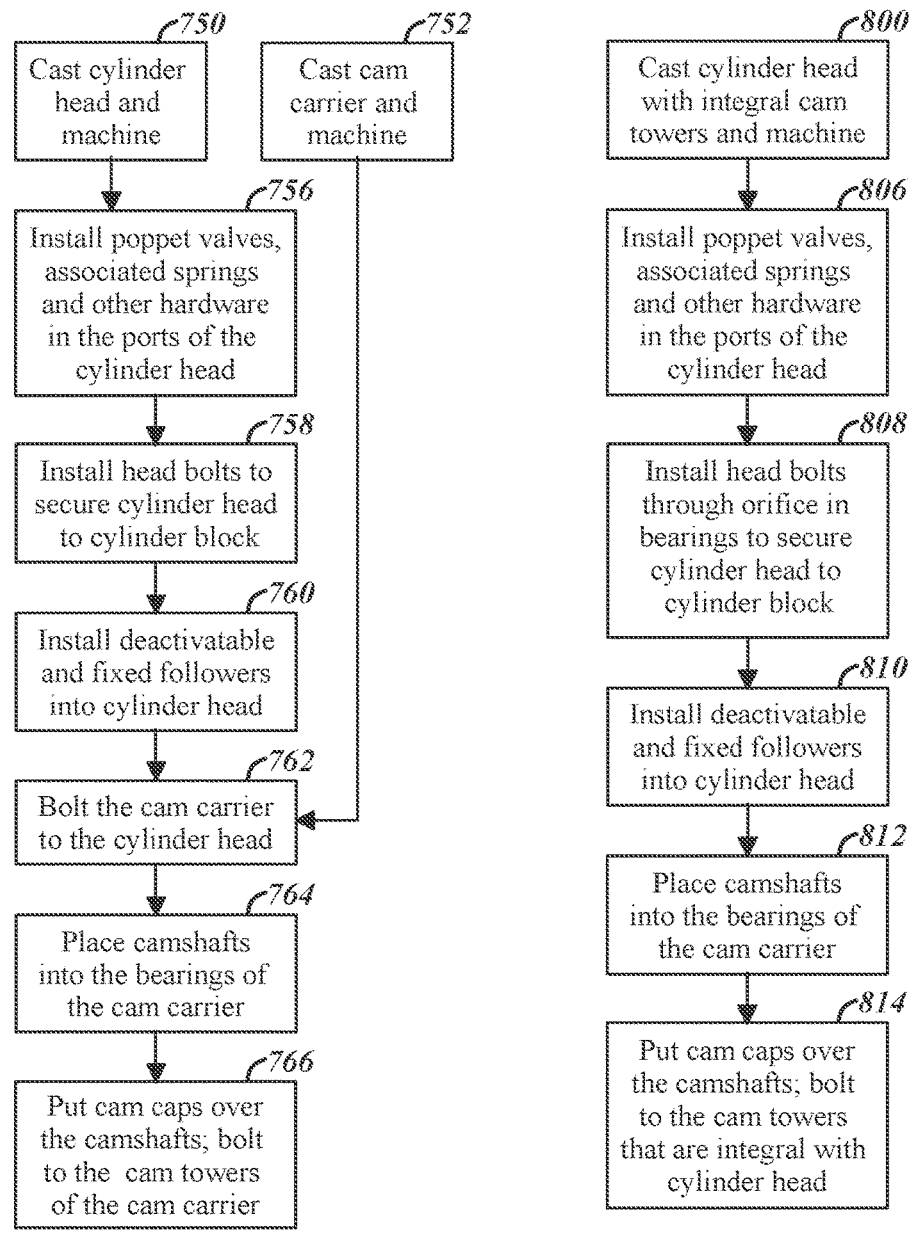
FIG. 12 shows processes by which a prior-art engine is assembled.
FIG. 13 shows processes by which an engine is assembled according to embodiments of the present disclosure.

Referring to FIG. 12, processes by which a cylinder head with valve deactivators and a cam carrier is assembled is shown in brief. A cylinder head is cast and machined in block 750. A cam carrier is cast and machined in block 752. There are many machining processes for preparing the cylinder head and the cam carrier for assembly.

The poppet valves and their associated springs and other hardware are installed in ports of the cylinder head in block 756. In block 758, the cylinder head is bolted to the engine block. The followers are installed and the camshafts are placed in the bearing surfaces of the cam carrier, in block 760. At least some of the followers are deactivatable to thereby deactivate the valves with which they are associated upon a command from an engine control unit. In block 762, the cam carrier is bolted to the cylinder head. At least some of the followers are deactivatable to thereby deactivate the valves with which they are associated upon a command from the engine control unit. In block 764, camshafts are placed into the bearings formed in the cam carrier. In block 766, cam caps are installed onto the cam towers of the cam carrier. The cam caps retain the camshafts in the bearing surfaces of the cam carrier. The process in FIG. 12 is for the prior-art configuration that employs a cam carrier.

A process for assembling a cylinder head with deactivatable followers is shown in FIG. 13. In block 800 a cylinder head is cast that has integral cam towers. The cylinder head is machined to include: orifices through which head bolts are provided (the head bolts pass through bearing surfaces in the cam towers); the cam towers are qualified to accommodate followers with deactivators, and bearing surfaces for the camshaft. In block 806, the poppet valves and associated hardware are installed into the ports in the cylinder head. In block 808, the cylinder head is bolted to the engine block with the head bolts passing through the bearings. In block 810, the followers are installed, some of which are deactivatable. In block 812, the camshafts, intake and exhaust, are placed in the bearings between the cam towers. In block 814, the cam caps are coupled to the cam towers of the cylinder head to capture the camshafts.

The cam towers are cast with the cylinder head. Casting processes do not provide the dimensional accuracy for many purposes. The cam towers are machined to provide bearing surfaces for the camshaft, as an example. In that situation, both the dimensional accuracy and surface finish are provided via the machining. The outside surfaces of the cam towers can encroach upon the space needed for the deactivatable followers, which are wider than the standard followers that do not allow deactivation. The cylinder head is machined to ensure that there is sufficient space for the deactivatable followers. Some of the material of the cam towers proximate the deactivatable followers may be removed to accommodate the deactivatable followers or other elements in the cylinder head.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A cylinder head assembly of an internal combustion engine, comprising:
   a cylinder head comprising:
      a plurality of combustion chambers tops each having two intake and two exhaust valves;
      cam towers unitarily formed with the cylinder head; and
   an intake camshaft having multiple cam lobes that act upon the intake valves via intake followers disposed in the cylinder head wherein at least a first portion of the intake followers are deactivatable and a second portion of the intake followers are fixed.

2. The cylinder head assembly of claim 1, further comprising:
   an exhaust camshaft having multiple cam lobes that act upon the exhaust valves via exhaust followers disposed in the cylinder head; and
   a bearing surface disposed between each pair of cam towers wherein:
      the intake camshaft is cradled in a first plurality of the bearing surfaces; and
      the exhaust camshaft is cradled in a second plurality of the bearing surfaces.

3. The cylinder head assembly of claim 2 wherein:
   the bearing surfaces have orifices defined therein to accommodate head bolts.

4. The cylinder head assembly of claim 3 wherein the bearing surfaces have first lands on a first side of the orifice associated with the bearing surface and second lands on a second side of the orifice.

5. The cylinder head assembly of claim 1 wherein the cylinder head has four cylinders, all of the valves associated with the inner cylinders having deactivatable intake followers and all of the valves associated with the outer cylinders having fixed intake followers.

6. The cylinder head assembly of claim 1 wherein the bearing surfaces are unitary with the cylinder head.

7. An internal combustion engine, comprising:
   a cylinder block;
   a cylinder head comprising:
   cam towers unitarily formed with the cylinder head;
   semicircular bearings located between pairs of cam towers, the semicircular bearings having orifices disposed therein;
   cylinder head bolts inserted in the orifices that engage with the cylinder block; and
   an intake camshaft cradled in a plurality of the intake camshaft having multiple cam lobes that actuate intake valves disposed in the cylinder head via intake followers wherein at least a portion of the intake followers are deactivatable wherein:
   the engine has an engine bank having four cylinders;
   intake valves in a first and a second of the four cylinders are provided with deactivatable intake followers; and
   intake valves in a third and a fourth of the four cylinders are provided with fixed intake followers.

8. The engine of claim 7, further comprising:
   cam caps placed over the camshaft; and
   bolts installed into orifices in the cam caps engaging with threads in the cam towers.

9. The engine of claim 7 wherein the engine further comprising:
   an exhaust camshaft cradled in a plurality of the bearings and having a plurality of cam lobes that act upon exhaust valves.

10. The engine of claim 7 wherein the bearings are unitary with the cylinder head.

11. The engine of claim 7 wherein the bearings have first and second lands on first and second sides of the orifice.

12. An internal combustion engine, comprising:
   a cast cylinder head having combustion chamber tops and a plurality of cam towers, the cam towers having bearing surfaces each having an orifice defined in the bearing surfaces;
   an engine block to which the cylinder head is bolted with bolts passing through the orifices in the bearing surfaces of the cam towers; and
   followers mounted in the cylinder head wherein at least half of the followers are deactivatable followers wherein:
   the cylinder head has four combustion chamber tops;
   each combustion chamber top has two intake valves and two exhaust valves disposed therein; and
   half of the intake valves and half of the exhaust valves are provided with the deactivatable followers.

13. The engine of claim 12, further comprising:
   Two intake poppet valve and two exhaust poppet valves installed into ports formed in each of the combustion chamber tops in the cylinder head.

14. The engine of claim 12, further comprising:
   camshafts placed in the cam towers; and
   cam caps secured onto cam towers of the cylinder head to thereby capture the camshafts.

15. The engine of claim 12 wherein the cam towers are unitary with the cylinder head.

16. The engine of claim 12 wherein the bearing surfaces have a first land on a first side of the orifice and a second land on a second side of the orifice.

* * * * *